United States Patent [19]

Lusch et al.

[11] 3,974,530

[45] Aug. 17, 1976

[54] ADJUSTABLE BED

[75] Inventors: Peter Lusch; Franz Horenkamp, both of Bielefeld, Germany

[73] Assignee: Ferdinant Lusch KG, Bielefeld, Germany

[22] Filed: Apr. 25, 1975

[21] Appl. No.: 571,618

[30] Foreign Application Priority Data

| | | |
|---|---|---|
| May 11, 1974 | Germany | 7416494[U] |
| Nov. 8, 1974 | Germany | 7437241[U] |
| Feb. 22, 1975 | Germany | 7505569[U] |

[52] U.S. Cl. ................................. 5/66; 5/68; 5/202
[51] Int. Cl.² .................... A61G 7/06; A41C 19/00
[58] Field of Search ...................... 5/66, 67, 68, 202

[56] References Cited
UNITED STATES PATENTS

| | | | |
|---|---|---|---|
| 3,283,342 | 11/1966 | Pankert | 5/66 |
| 3,581,326 | 6/1971 | Degen | 5/66 |
| 3,854,154 | 12/1974 | Degen | 5/66 |

*Primary Examiner*—Casmir A. Nunberg
*Attorney, Agent, or Firm*—Michael J. Striker

[57] ABSTRACT

An elongated frame has a head section, a foot section and a center section. Hinges connect the center section with the head section and with the foot section, respectively. The head section is pivoted to a support in the region where it is connected to the center section, so it can tilt about a first axis which extends transversely of the elongation of the frame. Below the center section the support is provided with pivots which define a second axis extending parallel to the first axis; on these pivots, tiltable elements are pivotably mounted. Each of the tiltable elements is formed with a guide passage extending normal to the second axis and through which an elongated guide member mounted on a lower side of the center section extends in slidable relationship. A disengageable arresting device is provided on the center and head sections and normally serves to block all of the sections against movement relative to one another and to the support; when the device is disengaged the head section can pivot about the first axis and the center section can pivot about the second axis and can also slide, together with the foot section, because the guide members can perform sliding movements in the guide passages of the tiltable elements.

15 Claims, 11 Drawing Figures

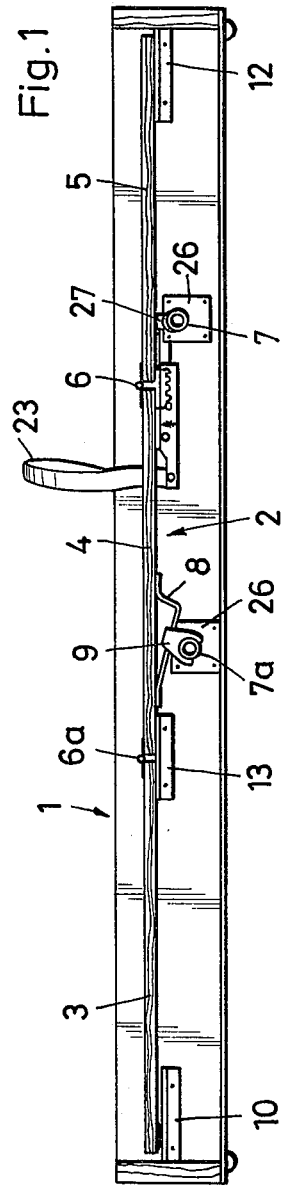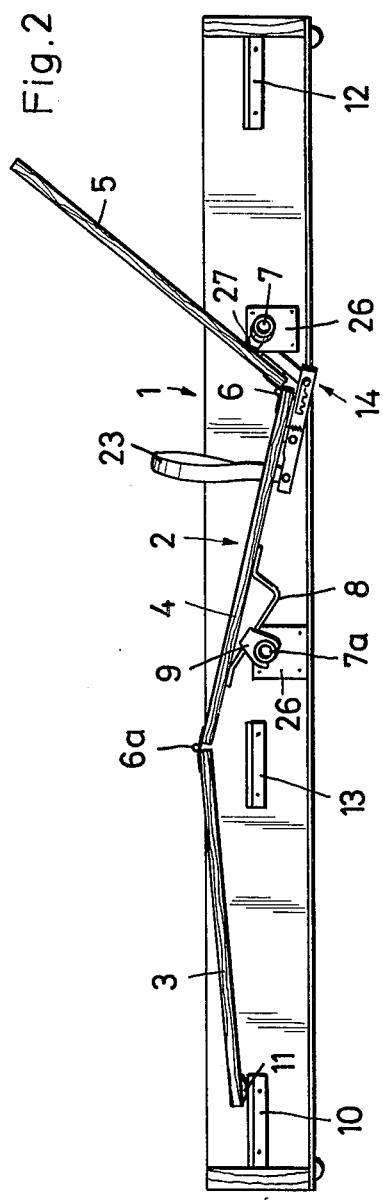

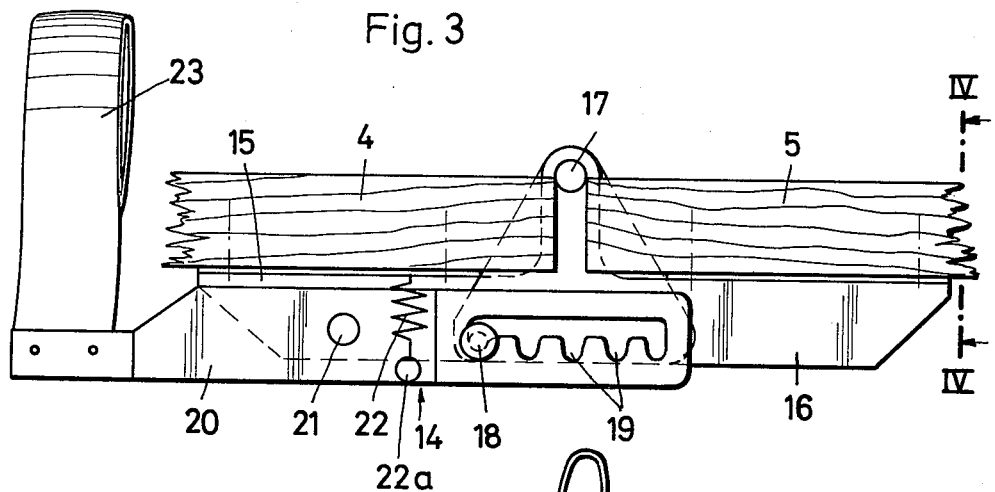
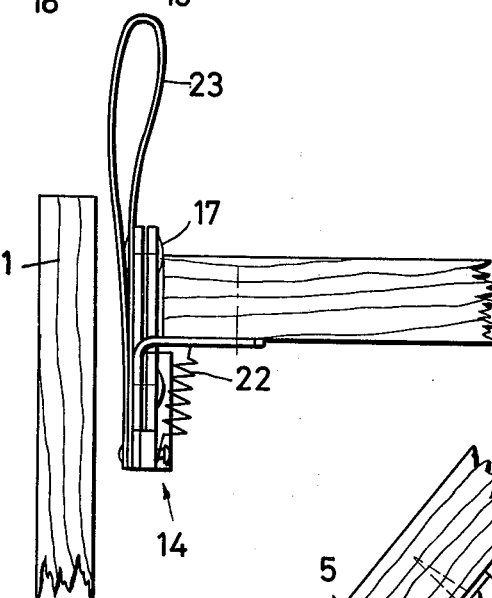
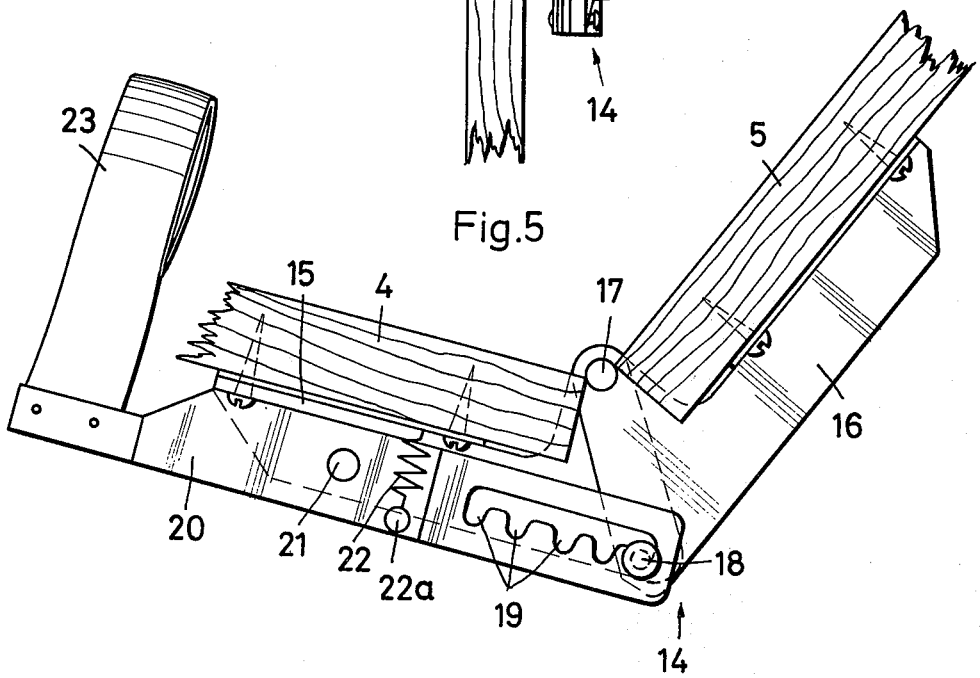

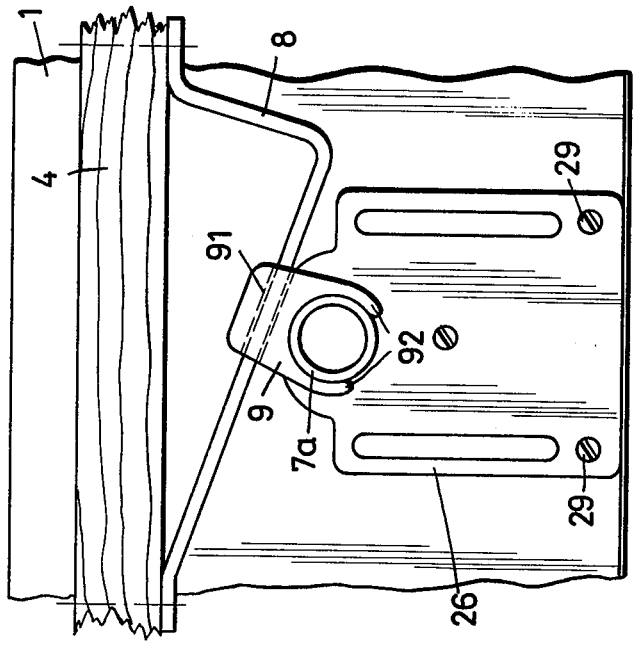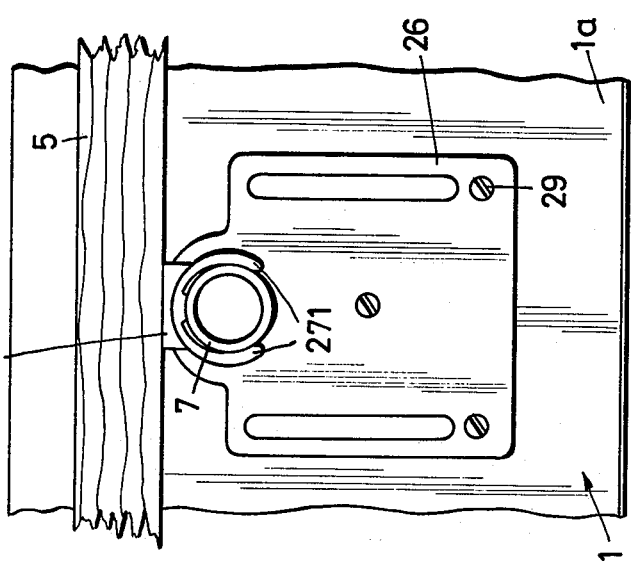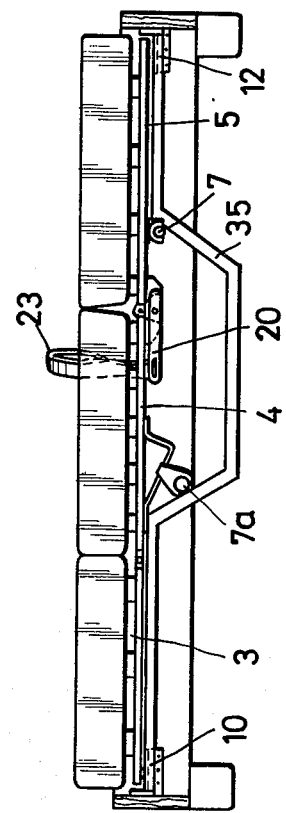

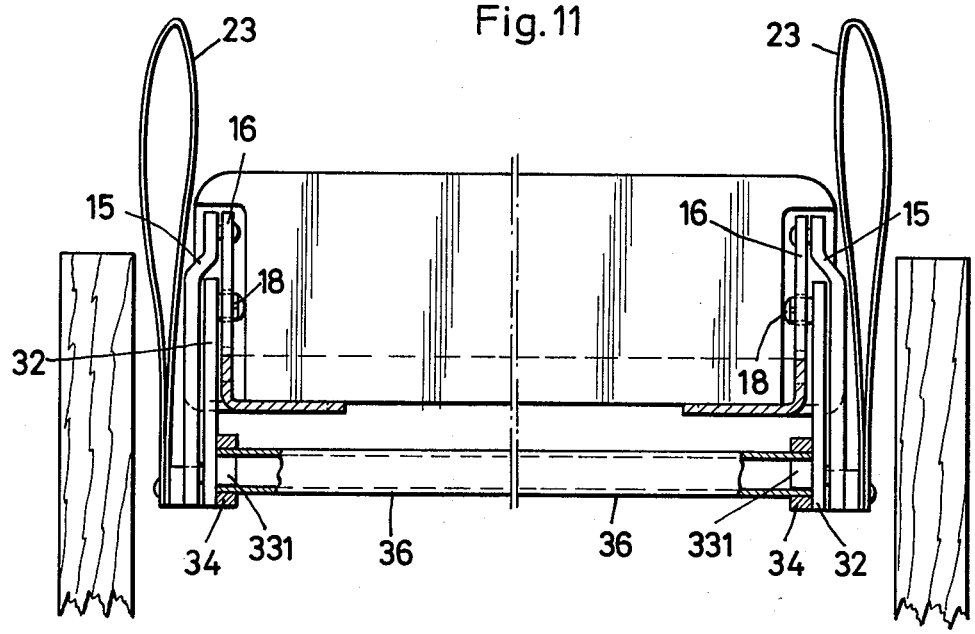

ADJUSTABLE BED

BACKGROUND OF THE INVENTION

The present invention is concerned with an adjustable bed.

The term "bed" as employed herein has been chosen for the sake of convenience; it is intended to encompass any type of adjustable furniture on which one may recline, for example regular beds, hospital beds, couches, chaises, and the like.

Adjustable beds of the type where different sections of the bed can be inclined relative to one another are already known. However, the fittings required to provide for the desired adjustability are very complicated and expensive. Moreover, these prior-art beds require in most instances considerable effort to adjust them from one position to another, and cannot be adjusted by a shifting in the weight of a person reclining on them. The installation and removal of the mechanism permitting the adjustments to be carried out, is in most instances cumbersome and time consuming.

SUMMARY OF THE INVENTION

Accordingly, it is a general object of this invention to provide an improved adjustable bed which does not have the disadvantages of the prior art.

More particularly, it is an object of the invention to provide such an adjustable bed which is simple in its construction and very easy and reliable to operate.

An additional object of the invention is to provide such an improved adjustable bed whereon the adjustments from position to position can be carried out readily and utilizing the weight of a person reclining on the bed.

Still another object of the invention is to provide such an adjustable bed wherein the installation and removal of the mechanism is simple and not time consuming.

In keeping with these objects, and with others which will become apparent hereafter, one feature of the invention resides in an adjustable bed which, briefly stated, comprises support means, an elongated frame having a head secton, a foot section and a center section, and first and second hinge means connecting the center section with the head section and with the foot section, respectively. First pivot means mounts the head section in the region of the first hinge means on the support means tiltable about a first axis extending transversely of the elongation of the frame. Second pivot means is provided on the support means and defines below the center section a second axis parallel to the first axis. Tiltable elements are pivotably mounted on the second pivot means and formed with guide passage extending normal to the second axis. Elongated guide members are mounted on a lower side of the center section and are each slidably received in one of the guide passages, extending lengthwise therethrough. Disengageable arresting means is provided on the center and head sections for normally blocking all of the sections against movement relative to one another and to the support means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a somewhat diagrammatic longitudinal section through a bed embodying the present invention, in a normal sleeping position;

FIG. 2 is a view similar to FIG. 1 except that it shows the bed in an upright or sitting position;

FIG. 3 is an enlarged sectional view, showing a detail of FIG. 1;

FIG. 4 is a section taken on line IV—IV of FIG. 3;

FIG. 5 shows the detail of FIG. 3 in the position which it assumes when the bed is in the position shown in FIG. 2;

FIG. 6 is a view showing a detail of FIG. 1 on an enlarged scale;

FIG. 7 is another fragmentary view, showing a further detail of FIG. 1 on an enlarged scale;

FIG. 8 is a side view illustrating a bed according to a further embodiment of the invention;

FIG. 11 is a section taken on line XI—XI of FIG. 9.

DESCRIPTION OF THE PREFERRED EMBODIMENTS

Figure 9:
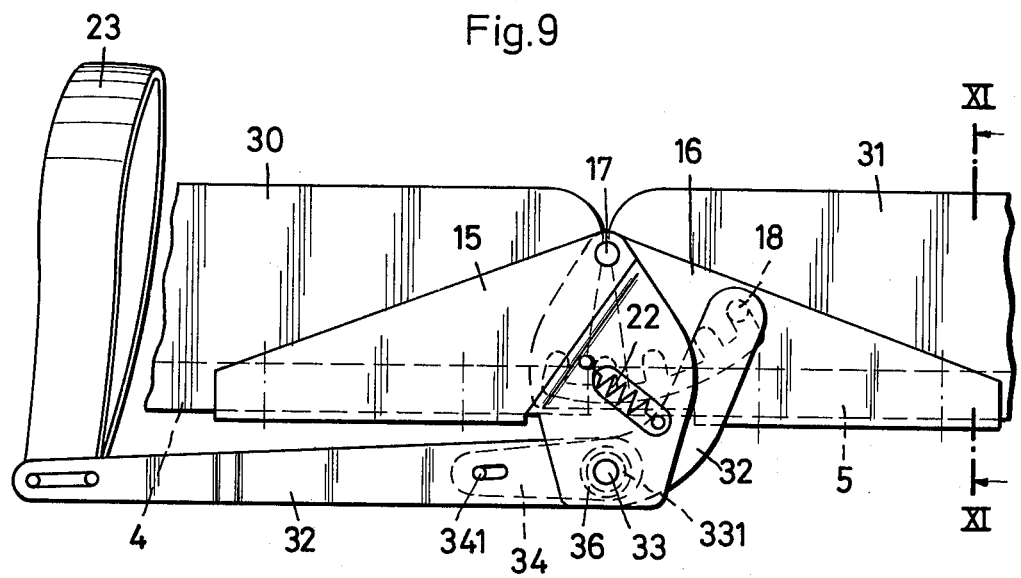
FIG. 9 is a fragmentary side view, illustrating a detail of a further embodiment of the invention in one position of the bed.

Referring to the drawing in detail, and describing firstly the embodiment illustrated in FIGS. 1–7, it will be seen that reference numeral 1 identifies a conventional support or bed frame which has the usual transversely extending frame members at its end and the longitudinally extending lateral frame members which connect the end frame members. Mounted in this frame 1 is a tripartite inner frame 2 on which in use the cushions, mattress sections or the like (not shown in FIGS. 1–7) will be supported. This frame 2 has a foot section 3, a center section 4 and a head section 5. The center section 4 is connected with the head section 5 by means of hinges 6 and with the foot section 3 by means of hinges 6a. Such hinges are entirely conventional and known per se to those skilled in the art. It will be evident that hinges 6 and 6a, as well as pivots to be described later, will be located at both lateral sides of the frame 2. The head section 5 is mounted in the region of its end that is adjacent the center section 4 for pivoting movement about an axis extending transversely to the elongation of the frames 1 and 2, by means of pivots 7 which are mounted on the lateral frame members of the frame 1. Mounted on the downwardly facing side of the center section 4 are elongated guide members 8 (one shown) which may, e.g. be of flat steel strips that have been shaped to the illustrated configuration. These members 8 are mounted to the underside of the section 4 so as to extend lengthwise of the frame 2; because of their shape it will be seen that from the front end (closer to the section 3) towards the rear end (closer to the section 5) the members 8 diverge away from the underside (in downward direction thereof) of the center section 4. Downwardly below the center section 4 the lateral frame members of the frame 1 carry further pivots 7a which define a second transversely extending pivot axis. Each of these pivots 7a carries a tiltable element 9 which is formed with a longitudinally extending passage 91 through which one of the members 8 slidably extends. The elements 9, which are more clearly shown in FIG. 7, are advantageously of stiff but slightly elastic synthetic plastic material and have downwardly extending claws 92. Because of the configuration of these claws (compare FIG. 7) and because the material of the members 9 has a slight ability to elastically yield, the members 9 can simply be snapped onto the pivots 7a which advantageously are configurated as short tubular sections. By exerting a pull upon the members 9 transversely to the elongation of the pivots 7a, the members 9 can be similarly simply disengaged from the pivots 7a. The pivots 7a may be secured to mounting plates 26, for example by means of welding, and the mounting plates 26 can be screwed to the lateral frame members of the frame 1 by screws 29 as shown.

The foot end of the foot section 3 (the left-hand end in FIGS. 1 and 2) rests on one or more support members 10 which are secured to the bed frame 1 and can slide on these members 10 lengthwise of the frame 1. To facilitate this sliding and reduce friction, the underside of the foot section 3 may have friction-reducing glide members 11 secured to it, for example part-spherical members of metal or of a synthetic plastic material such as polytetrafluoroethylene. When the frame 2 is in the completely flat position as shown in FIG. 1, the head end (the right-hand end in FIG. 1) of the head section 5 rests upon one or more support members 12 which for this purpose are also mounted on the bed frame 1. In this region of the hinges 6a the frame 2 is supported in this position by support members 13 which are also mounted on the lateral frame members of the bed frame 1.

The purpose of the present invention is to make it possible to adjust the frame 2 from the position shown in FIG. 1 to the position shown in FIG. 2, or the intermediate positions. On the other hand, undesired movements of the sections 3, 4 and 5 must be prevented, so that in any selected position, including the sleeping position of FIG. 1, the frame 2 can be reliably arrested. For this purpose a fitting 14 is provided in the region of the hinges 6, to cooperate with the head section 5 and the center section 4. The fitting 14 makes it possible to arrest the sections 4 and 5 in a plurality of relative angular positions, including the one shown in FIG. 1 and the one shown in FIG. 2. These angular positions can be changed only when the fitting 14 is disengaged; on the other hand, when such disengagement has been effected, a mere shifting of the weight of a person reclining on the frame 2 will suffice to effect relative displacement of the sections 4 and 5 and, concomitantly, of the sections 3 and 4. Once the desired orientation has been reached, for example the one in FIG. 2, the fitting is engaged again and the frame 2 is then reliably arrested in this position until the fitting is subsequently disengaged.

The arrangement of the members 8 beneath the lateral longitudinally extending portions of the frame section 4 assures a particularly simple and easy adjustment so that movements of the frame to any selected or desired position can be carried out by shifting the weight of a person reclining upon the bed, without requiring any particular exertion on the part of the user.

Details of the fitting 14, i.e. the disengageable arresting means, are shown in FIGS. 3–5. It will be seen that the fitting 14 has two angled members or brackets 15, 16 which are mounted on the lower sides of the sections 4 and 5, for example by means of the diagrammatically illustrated screws. The brackets 15 and 16 are connected with one another for relative pivotal displacement by a pivot 17, which may be a rivet. In the region of the downwardly facing edge of the angled bracket 16, which latter is the outer one of the two brackets as seen in lateral direction, the bracket 16 carries a projecting pin 18 which may advantageously (but need not) carry a roller or the like. A bracket 20 is pivotally mounted on the bracket 15 by means of the pivot 21 and provided with a cutout having a plurality of recesses or serrations 19. The pin 18 extends into this cutout and can enter into any of the serrations 19. A spring 22 has one of its end portions connected to the upper edge of the bracket 15 and its other end portion is connected to the lower edge of the bracket 20, for example by being hooked onto a pin 22a provided on the bracket 20. The spring 22 thus has the permanent tendency to tilt the bracket 20 about the pivot 21 in counterclockwise direction, that is to urge the serrations 19 into engagement with the pin 18, thus preventing unintentional pivoting of the sections 4 and 5 with reference to one another.

To enable a user to disengage this arrangement when pivoting of the sections 4 and 5 for the purpose of adjustment of the frame position is desired, a handle or loop 23 is provided on the end of the bracket 20 which is remote from the cutout having the serrations 19. This loop extends upwardly in the space between the frames 1 and 2 and can readily be engaged by a person resting on the bed. By exerting a simple pull in clockwise direction upon the loop 23, the bracket 20 will be similarly tilted about the pivot 21 in clockwise direction until the serration 19 in which the pin 18 is received at this time, moves out of engagement with the pin 18, thus permitting relative pivoting of the brackets 15 and 16 hence of the frame sections 4 and 5. As soon as the loop 23 is released, the spring 22 restores the bracket 20 to its rest position and the pin 18 will enter into one of the serrations 19, arresting the brackets 15 and 16 and hence the frame sections 4 and 5 in the newly selected position.

FIG. 6 shows in more detail how the head section 5 is pivotally mounted on the frame 1. Again, the pivots 7 are of short tubular sections which are secured (e.g. by welding) to sheet metal plates 26, the latter in turn being screwed to the inner sides of the longitudinally extending frame members of the frame 1. Evidently, the pivots 7 and 7a need not be tubular. Provided on the pivot 7 in FIG. 6 are support members 27 which may be of the same or an analogous synthetic plastic material as the one used for the elements 9. Of course, a material other than synthetic plastic could also be employed. The members 27 have claws 271 corresponding to the claws 92 of the elements 9, that is claws which because of the slight elastically yieldable characteristic of the material of the members 27 can be forced apart when they are pressed against the pivots 7 in direction normal to the elongation of the latter, to a sufficient extent so that they can be readily snapped onto or off the pivots 7. As the claws 92, the claws 271 also must surround the associated pivots over more than half the circumference thereof.

The use of the members 27 to support the frame section 5 is entirely adequate, since the members 27 on which the frame section 5 rests, pivot or swivel on the pivots 7 and are always subjected to forces which act predominantly in direction normal to the axes of the respective pivots 7. The use of the members 27 makes their installation and removal very simple.

It will be noted that in the embodiment of FIGS. 1–7 the pivot axis defined by the pivots 17 and the hinges 6 is located approximately at the level of the upper surface of the frame 2. Because of this, the embodiments of FIGS. 1–7 can be used only where the bed has loose cushions, bolsters or mattress sections. For applications wherein these cushions or the like are firmly secured to the respective sections 3–5 of the frame 2, this construction is not suitable.

Figure 10:
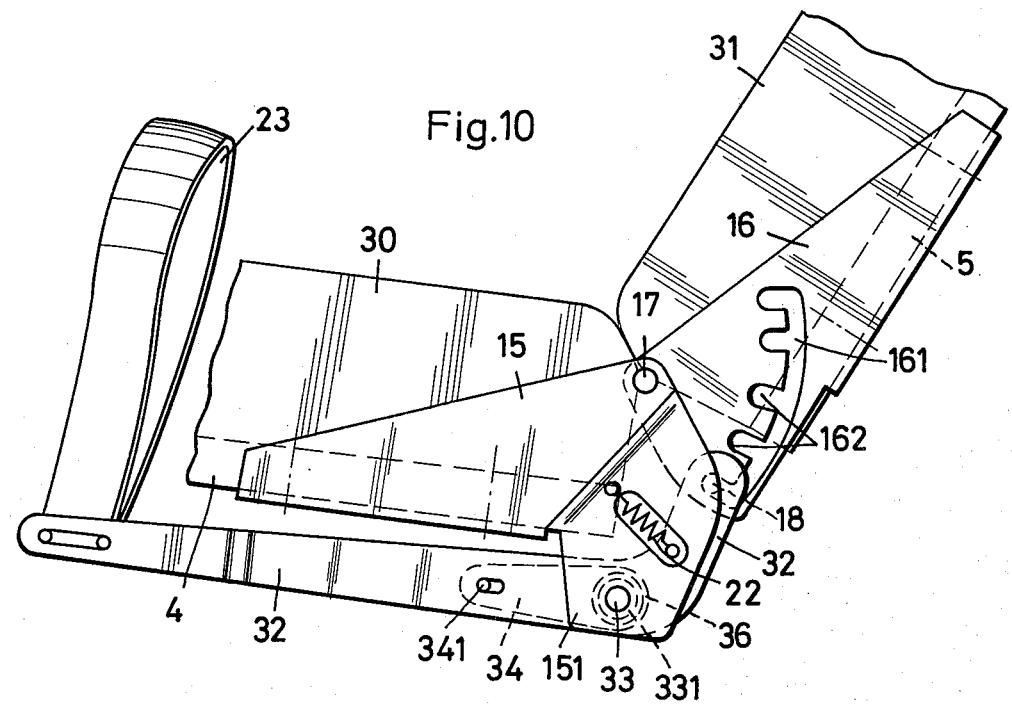
FIG. 10 shows the detail of FIG. 9 in another position of the bed.

FIGS. 9–11, however, illustrate a further embodiment which is suitable for firmly secured cushions or the like. In the embodiment of FIGS. 9–11 the pivot axis defined by the pivots 17 and hinges 6 is located upwardly of the upper surface of the frame 2, and in particular it is located almost at the level of the upper surface of the cushions 30 and 31 which are here firmly secured on top of the frame sections 4 and 5, respectively. Of course, a similar cushion will also be provided on the frame section 3 which is, however, not illustrated. Because of this particular arrangement chosen in FIGS. 9–11, the pivoting of the sections 4 and 5 relative to one another from the position of FIG. 9 to the position of FIG. 10 is not hindered by the presence of the fixedly mounted cushions 30, 31 as a consideration of FIG. 10 will indicate.

In the embodiment of FIGS. 9–11 like reference numerals identify like components as in the preceding embodiment. Here, however, the upright leg of the bracket 15 is provided with a downwardly extending angled portion 151 on which an angled arm 32 is pivotably secured by means of a pivot 33, for example a rivet. The arm 32 carries at its upwardly directed end a laterally projecting pin 18, corresponding to the one shown in FIG. 3. The upright leg of the bracket 16 is formed with an arcuate cutout 161 which is concentric to the pivot 17 and is provided with serrations or recesses 162 into which the pin 18 may enter. The spring 22 is again provided, engaging the arm 32 and permanently tending to pivot the same in a sense causing the pin 18 to enter into one of the serrations 162.

The free end of the arm 32 is again provided with a handle or loop 23 which is long enough to project upwardly of the cushions 30, 31 (compare FIGS. 9 and 10) to be readily engaged by a user. The operation of this embodiment is of course the same as in the embodiment of FIGS. 1–7 and need therefore not be specifically described.

As a general rule it will be sufficient to provide a single one of the fittings 14 on one lateral side of the narrower type of bed, for example single beds, chaises and the like. In case of wider beds, such as double beds, kingsize beds or queensize beds, it is necessary to provide on of the fittings 14 at each side. However, it is evident that in such a case both fittings must be operated simultaneously, and that a single user would find it extremely difficult to reach the handles or loops 23 of both fittings simultaneously, due to the width of the bed. To eliminate any difficulties in this respect the two fittings may be coupled so that when one is operated the other will simultaneously and automatically also be operated. FIGS. 9–11 show how this can be done according to one concept of the invention. The pivots or rivets 33 which mount the arms 32 for pivoting movement are provided on their inner ends, that is the ends which face towards one another across the width of the frame, with cylindrical heads 331. A tube 36 (shown in FIG. 11) is turnably mounted on these heads, which extend into its opposite open ends. This tube can turn relative to the heads 331 and carries at its opposite ends, i.e. adjacent the respective fittings 14, a pair of arms 34. These arms 34 extend transversely of the elongation of the tube and are fixedly connected with the same so that they rotate with the tube. The arms 34 each extend parallel to the longer arms 32 located at the opposite lateral sides of the bed and are connected with these arms by means of pins, screws or the like 341. Evidently, when one of the arms 32 is pivoted by pulling upon the loop 23, the motion will be transmitted via the tube to the other arm 32 and thus both fittings 14 will operate in unison.

If it is desired, in the case of beds intended for more than one person, to afford each person the possibility of separate adjustment, so that for example one person may lie flat and rest while the other person sits upright and reads, two of the frames 2 can be provided on a single support frame or bed frame 1. In such a case a board or other support may be provided which bisects the bed frame 1 lengthwise, and to which the inner pivots 7, 7a for the two frames 2 can be mounted. However, this may be undesirable and to avoid the necessity for such a measure, the embodiment in FIG. 8 provides an arrangement which eliminates the need for such a separate board. Instead, there is provided midway between the lateral frame members 1 (only one shown) a support bracket 35 which is advantageously of tubular cross-section, for example of quadratic cross-section, and which substantially in its center portion is bent downwardly as shown in FIG. 8, so that the downwardly bent portion can engage the floor and provide a support. The pivots 7, 7a for the inwardly facing lateral sides of the two frames 2 (only one shown) can then be mounted on this support bracket 35, for example by welding or the like. The support members 10, 12 mentioned in the first embodiment can be omitted in the embodiment of FIG. 8 since the end portions of the bracket 35, which are of course connected to the cross pieces of the frame 1, will perform the functions of the support members 10 and 12. Such an arrangement makes it possible to construct a double bed (or queensize or kingsize bed) whose surface is not interrupted at the center by a board but which yet can be adjusted to the preference to two users simultaneously, i.e. each side can be adjusted independently of the other since two of the frames 2 are present.

It will be appreciated that various modifications can be made without departing from the scope and intent of the invention, for example although reference has been made to the "frame" 2, it is clear that the sections 3, 4 and 5 could also be constructed as panels rather than as frames. It is further evident that the connection which has been illustrated in FIGS. 9–11 for simultaneous operation of two fittings 14 located at opposite lateral sides of a bed, could also be employed in the other embodiments of the invention.

It will be understood that each of the elements described above, or two or more together, may also find a useful application in other types of constructions differing from the types described above.

While the invention has been illustrated and described as embodied in an adjustable bed, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An adjustable bed, comprising support means; an elongated frame comprising a head section, a foot section and a center section; first and second hinge means connecting said center section with said head section and said foot section, respectively; first pivot means mounting said head section in the region of said first hinge means on said support means tiltable about a first axis extending transversely of the elongation of said frame; second pivot means on said support means and defining below said center section a second axis parallel to said first axis; mounting means for permitting movement of the center section in direction of the elongation of the frame and about said second axis, including tiltable elements pivotably mounted on said second pivot means and formed with guide passages extending normal to said second axis, and elongated guide members fixedly mounted on a lower side of said center section and each slidably extending lengthwise of said frame and through one of said guide passages; and disengageable arresting means on said center and head sections for normally blocking all of said sections against movement relative to one another and to said support means.

2. A bed as defined in claim 1, wherein said elongated guide members are flat strips.

3. A bed as defined in claim 1, wherein said foot section has a free end; and further comprising friction-reducing glide means at said free end of said foot section in sliding engagement with said support means.

4. A bed as defined in claim 1; and further comprising mounting elements on said support means below said head section so as to support the latter.

5. A bed as defined in claim 4, wherein at least some of said elements are provided with resiliently yieldable claws surrounding the respective pivot means over more than 180° of arc.

6. A bed as defined in claim 1, said guide members having front ends closer to said foot section and rear ends closer to said head section, said front and rear ends being connected to said center section and said guide members being downwardly spaced from said center section intermediate said ends by a distance which increases continuously in direction towards said rear ends.

7. A bed as defined in claim 1, wherein said arresting means comprises a first component mounted on said center section, a second component mounted on said head section, and a pivot component connecting said first and second components and forming a transverse pivot axis which is upwardly spaced from said frame.

8. A bed as defined in claim 1, wherein said support means comprises a support frame and a support bracket mounted on said support frame substantially midway between the lateral sides thereof, said support bracket having spaced ends and an intermediate portion which extends downwardly of said support frame for floor engagement, some of said pivot means being carried by said support bracket.

9. An adjustable bed, comprising support means; an elongated frame comprising a head section, a foot section and a center section; first and second hinge means connecting said center section with said head section and said foot section, respectively; first pivot means mounting said head section in this region of said first hinge means on said support means tiltable about a first axis extending transversely of the elongation of said frame; second pivot means on said support means and defining below said center section a second axis parallel to said first axis; tiltable elements pivotably mounted on said second pivot means and formed with guide passages extending normal to said second axis; elongated guide members mounted on a lower side of said center section and each slidably extending lengthwise of said frame and through one of said guide passages; and disengageable arresting means on said center and head sections for normally blocking all of said sections against movement relative to one another and to said support means, said arresting means comprising a first angle component mounted on said center section, a second angle component mounted on said head section, a pivot component connecting said first and second components for pivoting about a transverse pivot axis, an arm pivotably mounted on one side of said first and second components and provided with a plurality of serrations, a pin mounted on the other of said first and second components, and a biasing element permanently urging said arm to a position in which said pin engages in one of said serrations.

10. An adjustable bed, comprising support means; an elongated frame comprising a head section, a foot section and a center section; first and second hinge means connecting said center section with said head section and said foot section, respectively; first pivot means mounting said head section in the region of said first hinge means on said support means tiltable about a first axis extending transversely of the elongation of said frame; second pivot means on said support means and defining below said center section a second axis parallel to said first axis; tiltable elements pivotably mounted on said second pivot means and formed with guide passages extending normal to said second axis; elongated guide members mounted on a lower side of said center section and each slidably extending lengthwise of said frame and through one of said guide passages; and disengageable arresting means on said center and head sections for normally blocking all of said sections against movement relative to one another and to said support means, said arresting means comprising a unit including a first angle component having an upright leg and being mounted on said center section, a second angle component also having an upright leg and being mounted on said head section, a pivot component connecting said first and second components for pivoting about a transverse pivot axis which is upwardly spaced from said frame, one of said upright legs being formed with a serrated arcuate cut-out concentric to said transverse pivot axis, and the other component carrying a pivotable arm provided with a pin which extends into said cut-out for cooperative engagement with the serrations thereof.

11. A bed as defined in claim 10, wherein said frame has two lateral sides, said unit being mounted at one of said sides and said arresting means comprising an identical unit mounted at the other of said sides; and further comprising connecting means connecting said units for joint pivoting of the arms thereof when one of said arms is pivoted.

12. A bed as defined in claim 11, said arms each being pivotably mounted on the pivot components of said units and said pivot components each having a cylindrical head facing towards the respectively other pivot component; said connecting means comprising a tube journalled in said heads, a pair of levers fixedly mounted on said tube adjacent the respective head so as to turn with the tube, and connecting portions connecting each lever with the respectively proximal one of said arms so that said tube is turned when one of said arms is pivoted.

13. A bed as defined in claim 8, wherein said support bracket is of tubular configuration.

14. A bed as defined in claim 8, wherein said spaced ends of said support bracket constitute supports for said head section and said foot section, respectively.

15. An adjustable bed, comprising support means; an elongated frame comprising a head section, a foot section and a center section; first and second hinge means connecting said center section with said head section and said foot section, respectively; first pivot means mounting said head section in the region of said first hinge means on said support means tiltable about a first axis extending transversely of the elongation of said frame; second pivot means on said support means and defining below said center section a second axis parallel to said first axis; tiltable elements pivotably mounted on said second pivot means and formed with guide passages extending normal to said second axis; elongated guide members mounted on a lower side of said center section and each slidably extending lengthwise of said frame and through one of said guide passages, said guide members having front ends closer to said foot section and rear ends closer to said head section, said front and rear ends being connected to said center section and said guide members being downwardly spaced from said center section intermediate said ends by a distance which increases continuously in direction towards said rear ends; disengageable arresting means on said center and head sections for normally blocking all of said sections against movement relative to one another and to said support means; and mounting elements on said support means below said head section so as to support the latter, at least some of said elements being provided with resiliently yieldable claws surrounding the respective pivot means over more than 180° of arc.

* * * * *